United States Patent

Weber

Patent Number: 6,123,852
Date of Patent: Sep. 26, 2000

[54] METHOD FOR THE ADSORPTIVE EXTRACTION OF HYDROCARBONS FROM AQUEOUS SOLUTIONS OF HYDROCYANIC ACID

[75] Inventor: Günter Weber, Tacherting, Germany

[73] Assignee: SKW Trostberg Aktiengesellschaft, Trostberg, Germany

[21] Appl. No.: 09/174,230

[22] Filed: Oct. 16, 1998

[30] Foreign Application Priority Data

Nov. 3, 1997 [DE] Germany ............... 197 48 513

[51] Int. Cl.[7] ............... C01C 3/02; C02F 1/28
[52] U.S. Cl. ............ 210/691; 210/908; 210/909; 423/372
[58] Field of Search ............ 423/371; 210/909, 210/908, 691

[56] References Cited

U.S. PATENT DOCUMENTS

| | | | |
|---|---|---|---|
| 3,597,167 | 8/1971 | Marks et al. | 210/691 |
| 3,647,685 | 3/1972 | Menashi et al. | 210/691 |
| 3,655,519 | 4/1972 | Scherhag et al. | 423/372 |
| 5,505,921 | 4/1996 | Luckoff et al. | 423/584 |
| 5,567,318 | 10/1996 | Beall | 210/691 |
| 5,676,845 | 10/1997 | Derleth et al. | 210/909 |

FOREIGN PATENT DOCUMENTS

| | | | |
|---|---|---|---|
| 1271091 | 6/1968 | Germany | 423/372 |
| 78967 | 1/1971 | Germany | 210/691 |
| 2287 | 1/1970 | Japan | 210/691 |
| 20073 | 2/1976 | Japan | 210/691 |
| 712120 | 1/1980 | U.S.S.R. | 210/691 |
| 1247720 | 9/1971 | United Kingdom . | |

*Primary Examiner*—Wayne Langel
*Attorney, Agent, or Firm*—Fulbright & Jaworski, LLP

[57] ABSTRACT

According to this method for the adsorptive extraction of hydrocarbons from aqueous solutions of hydrocyanic acid, the initial solutions containing 1 to 50 wt. % hydrocyanic acid and 2 to 1000 wt. ppm aliphatic and/or aromatic hydrocarbons, the latter having 6 to 30 C atoms each, are passed, preferably continuously, at temperatures between 2 and 50° C. and at a maximum flow velocity of 500 m/h through a fixed-bed, activated-carbon adsorber whose interior surface is preferably >100 m$^2$/kg. In this way it is possible to quantitatively free aqueous solutions of hydrocyanic acid from hydrocarbons, in particular from benzene, with means of relatively low technical complexity.

9 Claims, No Drawings

METHOD FOR THE ADSORPTIVE EXTRACTION OF HYDROCARBONS FROM AQUEOUS SOLUTIONS OF HYDROCYANIC ACID

The subject matter of this invention is a method for the adsorptive extraction of hydrocarbons from aqueous solutions of hydrocyanic acid.

Especially for the production of compounds which serve as precursors in special syntheses of the pharmaceuticals and agrochemicals industries, grades of hydrocyanic acid are used which, on account of the acid's origin, contain traces of hydrocarbons, such as benzene. During the syntheses by which the precursors are obtained, these impurities form by-products which have a negative influence on quality criteria, such as the purity or yield, of the products proper, and which, above all, cannot be tolerated by the pharmaceuticals or agrochemicals industries, which process these products.

Subsequent purification of the precursors, on the one hand, is technically too complicated and therefore out of the question from an economic point of view; on the other hand, however, the relatively less difficult and, from the cost aspect, just warrantable adsorptive extraction of hydrocarbons from the various intermediate stages, for example with the help of activated carbon or molecular sieves, has proved to be unfeasible in practice.

It is generally known from the prior art that activated carbon can be used effectively to purify—among other things—liquids contaminated by hydrocarbons. The extraction of benzene from water, for example, constitutes one of the routine uses of activated carbon.

The object of this invention was thus to provide a method with which, by means of adsorption, hydrocarbons can be extracted effectively, in a relatively simple manner, and at reasonable cost from hydrocyanic acid products.

The object was established by means of a method in which an aqueous initial solution containing 1 to 50 wt. % hydrocyanic acid and 2 to 1000 wt. ppm hydrocarbons is passed at temperatures between 2 and 50° C. and at a maximum flow velocity of 500 m/h through a fixed-bed adsorber containing activated carbon.

Surprisingly, it was found when implementing this method that the amount of activated carbon required decreases with increasing level of dilution of the hydrocyanic acid. At the same time, the adsorption capacity of the activated carbon increases with increasing water-dilution of the hydrocyanic acid. Likewise surprising was the fact that the hydrocarbon impurities, especially benzene, can be extracted quantitatively even from relatively high concentrated solutions containing up to 50 wt. % hydrocyanic acid.

Since the adsorption capacity of the various grades of commercially available activated charcoal is strongly dependent on the concentrations of the individual systems to be purified, it is preferable to use, for the method of the invention, an initial solution which contains 10 to 40 wt. % hydrocyanic acid and 10 to 100 wt. ppm hydrocarbon.

What was especially surprising when the method of the invention was implemented in practice was the fact that the quantitative purification of aqueous solutions of hydrocyanic acid need not be limited to the extraction of certain hydrocarbons, but that all aliphatic and/or aromatic hydrocarbons having 6 to 30 carbon atoms, and optionally also heterocyclic atoms such as N and S, can be extracted adsorptively from the initial hydrocyanic acid containing solutions. It makes no difference at all whether the aliphatic hydrocarbons are predominantly straight-chain or branched, or whether the aromatic hydrocarbons contain heterocyclic atoms. Substituents which may be present do not impair the attainable level of purification either.

The activated carbon's interior surface, on which the impurities are adsorbed, can of course have an important influence on the success of the method. To remove hydrocarbons as claimed for the method of the invention, preferably having more than six C atoms, grades of activated carbon which have an interior surface area of more than 50 $m^2$/kg have proved especially suitable. Even greater preference is given to grades of activated carbon having an interior surface area of at least 100 $m^2$/kg. Examples of such grades of activated carbon are Carbotech W 1–3 from the company Carbo-Tech, and Hydraffin UV43 or Desorex K40 from the company Lurgi. However, other types of activated carbon are also suitable, provided they are of a corresponding quality.

Apart from the composition and the concentration of the initial solutions, the temperature and the flow velocity at which the solutions are passed through the activated-carbon adsorber are of major importance for the success of the method of the invention. Temperatures of 5 to 20° C. and flow velocities of 1 to 400 m/h are preferred.

By contrast, it is completely irrelevant for the success of the purification process whether it is a continuous or a batch-wise process. The decision as to how the method of the invention be implemented will depend, for example, on the volumes of hydrocyanic acid solution to be purified and on the location of the purification facility.

Especially in cases where the method of the invention is implemented as a continuous process, it has proved very economical in respect of the quantities of activated charcoal needed if use is made of a so-called moving bed, thus rendering the process in fact pseudo-continuous.

Technically speaking, the method of the invention is altogether relatively uncomplicated to implement. However, special conditions may make it justifiable—in order to maximize adsorption—to adjust the pH of the initial solution until it is acidic by adding an inorganic or organic acid, for example to the pump receiver, and to stabilize the pH at about 3 to 6, most preferably at about 4. It is also advisable to flush the adsorber packing afterwards, for example with water, so as to remove any hydrocyanic acid that may still be present. This can be especially important with regard to disposal or regeneration of the activated carbon. It may also be necessary in this context to flush the adsorber packing with an aqueous hypochlorite solution.

All in all, the method of the invention is distinguished by the relatively simple technical setup required and the uncomplicated implementation, combined with a surprisingly high level of purification. Especially from economic aspects, the method provides a reasonably-priced alternative to other technical procedures.

The following examples serve to illustrate these advantages.

EXAMPLES

The results given in Table 1 were obtained in the following way: An activated-carbon fixed-bed adsorber packed with 1 kg of activated carbon (Carbotech W 1–3; interior surface 1000 $m^2$/kg) was introduced into a reaction vessel. Undiluted hydrocyanic acid with a benzene concentration of 200 ppm was pumped at a temperature of 10° C. and a flow velocity of 200 m/h through the adsorber from the bottom to the top until the activated carbon was loaded to capacity, ie, until the solution exiting from the adsorber contained a maximum of 10% of the initial hydrocarbon load (comparative example 1). The same initial mixture of hydrocyanic acid and benzene was diluted with water, as provided for in the invention, to give 50, 40, 30 and 20 wt. % hydrocyanic acid solutions, which were treated as described above (examples 2 to 5).

TABLE 1

| Example | Initial solution | | Volume pumped through (l) | Activated carbon required (kg/kg benzene) |
| --- | --- | --- | --- | --- |
| | Hydrocyanic acid (wt. %) | Benzene (wt. ppm) | | |
| 1 (Comparison) | 100 | 200 | 6 | 833 |
| 2 | 50 | 100 | 45 | 222 |
| 3 | 40 | 80 | 200 | 62 |
| 4 | 30 | 60 | 280 | 59 |
| 5 | 20 | 40 | 875 | 29 |

The results show that despite the use of large quantities of activated carbon, only a small amount of benzene can be extracted adsorptively from undiluted hydrocyanic acid (comparative example 1). By contrast, a much greater volume of hydrocarbon (benzene) can be extracted from aqueous solutions of hydrocyanic acid, the amount extracted increasing with increasing degree of dilution. The amounts extracted in this case are far greater than what would correspond to the actual dilution ratio.

The amount of activated carbon required for more dilute solutions of hydrocyanic acid is accordingly much less than for undiluted hydrocyanic acid. At the same time, the adsorption capacity of the activated carbon increases with increasing dilution of the acid.

What is claimed is:

1. A method for the adsorptive extraction of hydrocarbons from aqueous solutions of hydrocyanic acid using activated carbon, wherein an initial solution which contains 1 to 50 wt. % hydrocyanic acid and 2 to 1000 wt. ppm hydrocarbon is passed at temperatures between 2 and 50° C. and at a maximum flow velocity of 500 m/h through a fixed-bed adsorber containing activated carbon.

2. The method of claim 1, wherein the initial solution contains 10 to 40 wt. % hydrocyanic acid.

3. The method of claim 1, wherein the hydrocarbon content of the initial solution is 10 to 100 wt. ppm.

4. The method of claim 1, wherein the hydrocarbons are aliphatic and/or aromatic compounds containing 6 to 30 C atoms each.

5. The method of claim 1, wherein activated carbon is used which has an interior surface of >100 m$^2$/kg.

6. The method of claim 1, wherein the adsorption is conducted at temperatures from 5 to 20° C.

7. The method of claim 1, wherein the flow velocity is 1 to 400 m/h.

8. The method of claim 1, wherein said method is implemented as a continuous process.

9. The method of claim 1, wherein the adsorption is carried out pseudo-continuously in a moving bed.

* * * * *